April 1, 1924.

B. S. ROBINOFF 1,489,153

PLATE WELDING APPARATUS

Filed July 31, 1922

Witnesses:
Edwin Trueb

Inventor:
BORIS S. ROBINOFF,
by D. Anthony Usina
his Attorney

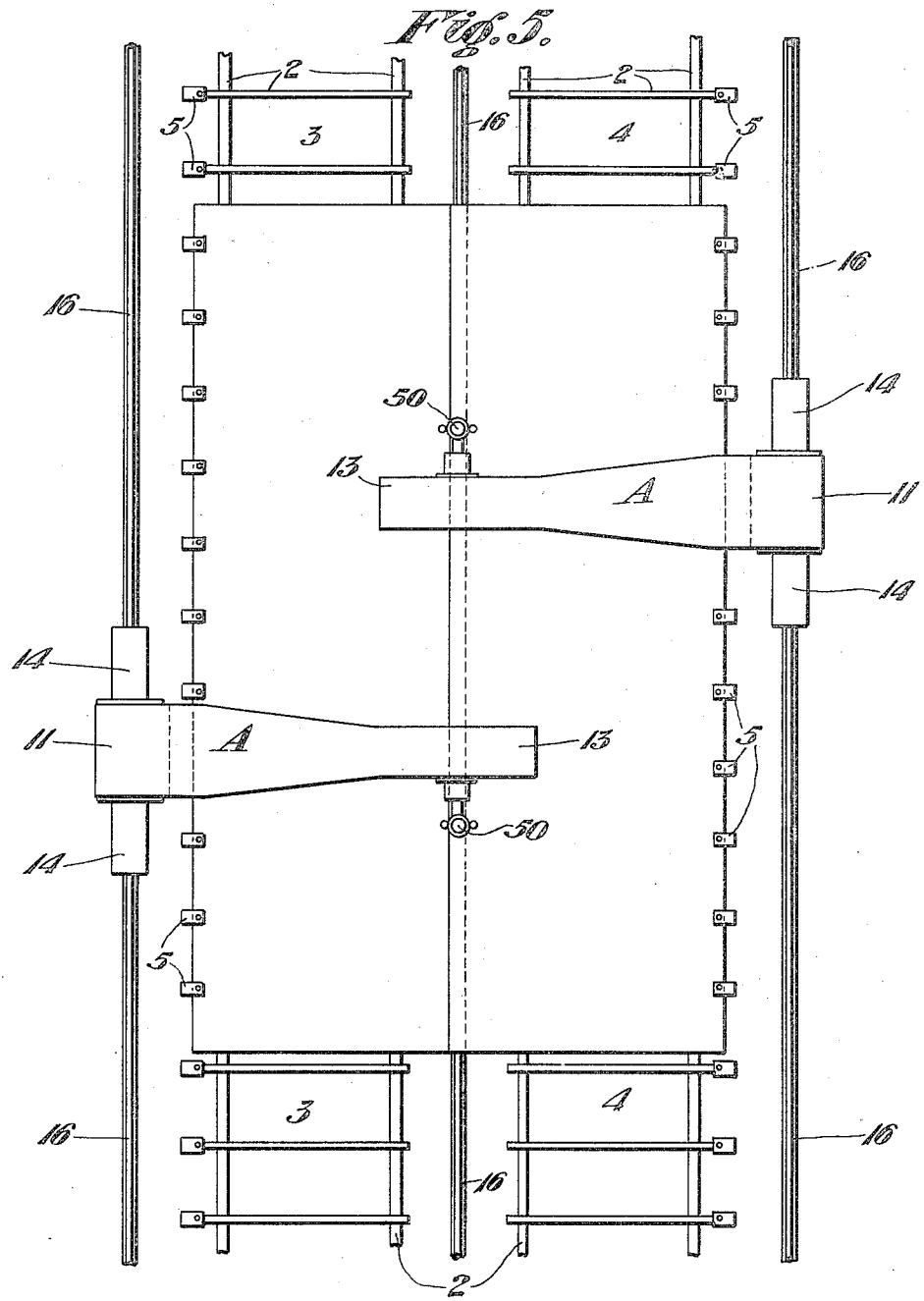

Patented Apr. 1, 1924.

1,489,153

UNITED STATES PATENT OFFICE.

BORIS S. ROBINOFF, OF PITTSBURGH, PENNSYLVANIA, ASSIGNOR TO NATIONAL TUBE COMPANY, OF PITTSBURGH, PENNSYLVANIA, A CORPORATION OF NEW JERSEY.

PLATE-WELDING APPARATUS.

Application filed July 31, 1922. Serial No. 578,527.

*To all whom it may concern:*

Be it known that I, BORIS S. ROBINOFF, a citizen of the United States, and resident of Pittsburgh, in the county of Allegheny and State of Pennsylvania, have invented certain new and useful Improvements in Plate-Welding Apparatus, of which the following is a specification.

This invention relates to welding apparatus and more particularly to plate welding apparatus, primarily adapted for lap welding large plates together for use in making large diameter welded pipe.

One object of this invention is to provide an apparatus of this class that will heat and hammer-weld the plates, forming a perfect and durable weld.

Another object is to provide an apparatus of this type that will reduce the labor necessary to weld the plates to a minimum.

A still further object is to provide an apparatus of this type having the novel design, construction and combination of parts described and set forth in the following specification and illustrated in the accompanying drawings.

In the drawings—

Figure 5 is a diagrammatic plan view showing the use of two welding machines adapted to operate simultaneously on the plates to be welded.

Figure 1:
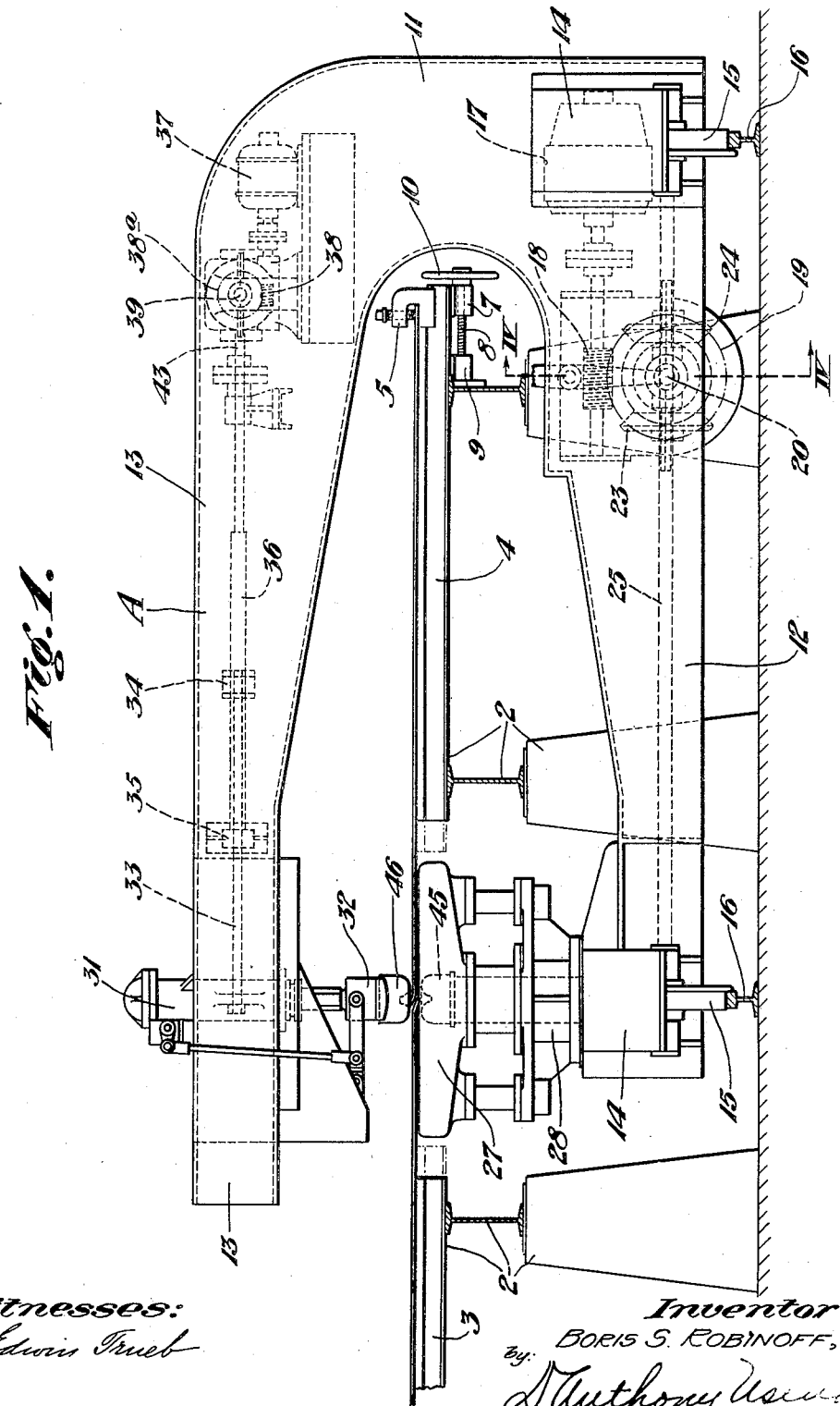
Figure 1 is a side elevation of the apparatus.

Referring more particularly to the drawings, the numeral 2 designates the supporting frame of the table which is adapted to support the plates to be welded. The top of the table is formed in two sections, 3 and 4, spaced apart an appreciable distance to permit the operation of the welding machine.

The top sections, 3 and 4, are provided with a plurality of clamp members 5 slidably mounted for movement transversely of the table. Each of the clamps 5 is provided with a depending lug 7 having a screw threaded aperture therein, and an adjusting screw 8 is threaded in the aperture and journaled in a bearing 9 on the table. The adjusting screws are provided with a hand wheel 10 for operating them to move the clamps transversely of the table.

One or two welding machines A may be used to weld the plates as desired. Preferably two machines will be used, operating in opposite directions. That is, from the center toward the outer edges or from the edges toward the center of the plate.

The welding machines comprise a U-shaped frame member 11 having its lower leg 12 extending under the table and its upper leg 13 extending over the table. The frame 11 is provided with wheeled trucks 14 at each end having flanged wheels 15 journaled therein adapted to travel upon tracks 16.

The welding machines are driven on the tracks 16 in a direction parallel to the weld being made in the plate by a motor 17, which has its armature shaft operatively connected to drive a worm 18 in mesh with a worm wheel 19 on drive shaft 20. The shaft 20 is journaled in suitable bearings 21 and has a bevel gear 22 thereon, which is in mesh with gears 23 or 24, loosely mounted on the shaft or axle 25 of one set of the wheels 15. The gears 23 and 24 are adapted to be operatively connected to the shaft or axle 25 independently by means of the clutch 26, for forward and reverse movement, respectively.

The lower leg 12 has an anvil or die 27 mounted for vertical movement in a fluid cylinder 28 at its forward end, and is adapted to be moved upwardly into engagement with the underside of the plates to be welded.

The upper leg 13 has its forward portion slotted and provided with cross-head guides 29 on which is mounted a suitable cross-head 30 carrying a fluid pressure cylinder 31. A hammer 32 is mounted in the cylinder 31 and adapted to be reciprocated vertically thereby to form the weld in the plates.

The cross-head 30 is provided with a pair of connecting or tie rods 33, which extend rearwardly along the machine and carry a yoke 34 at their rear ends.

The rods 33 pass through a guide block 35 at a point intermediate their ends, which serves to support them. The yoke 34 has a screw threaded aperture therein, and a screw shaft 36 is threaded in the aperture and has its forward end journaled in the guide block 35. The shaft 36 is adapted to be rotated by a motor 37 which has its armature shaft operatively connected to a worm shaft carrying a worm 38 which is in mesh with a worm wheel 38ª on a shaft 39. A bevel gear 40 is mounted on the shaft 39 and is in mesh with bevel gears 41, 42 loosely mounted on a shaft 43 which is coupled to the screw shaft 36. A clutch 44 is mounted between the gears 41 and 42 and is adapted to be engaged to either one of the gears as desired to operatively connect them to the shaft 43 for causing rotation of the shaft 36 to move the cross-head 30 and hammer 32 across or transversely of the weld.

Gaseous fuel burners 45 and 46 are mounted or carried by the lower and upper legs 12 and 13 of the machine, respectively, and are adapted to heat the portions of the plates to be welded.

The burners 45 and 46 are mounted on the ends of plungers 47 and 48, respectively, of fluid pressure cylinders 49 and 50, so as to provide for vertical movement thereof into and out of engagement or close proximity with the plates to be welded.

Figure 2:
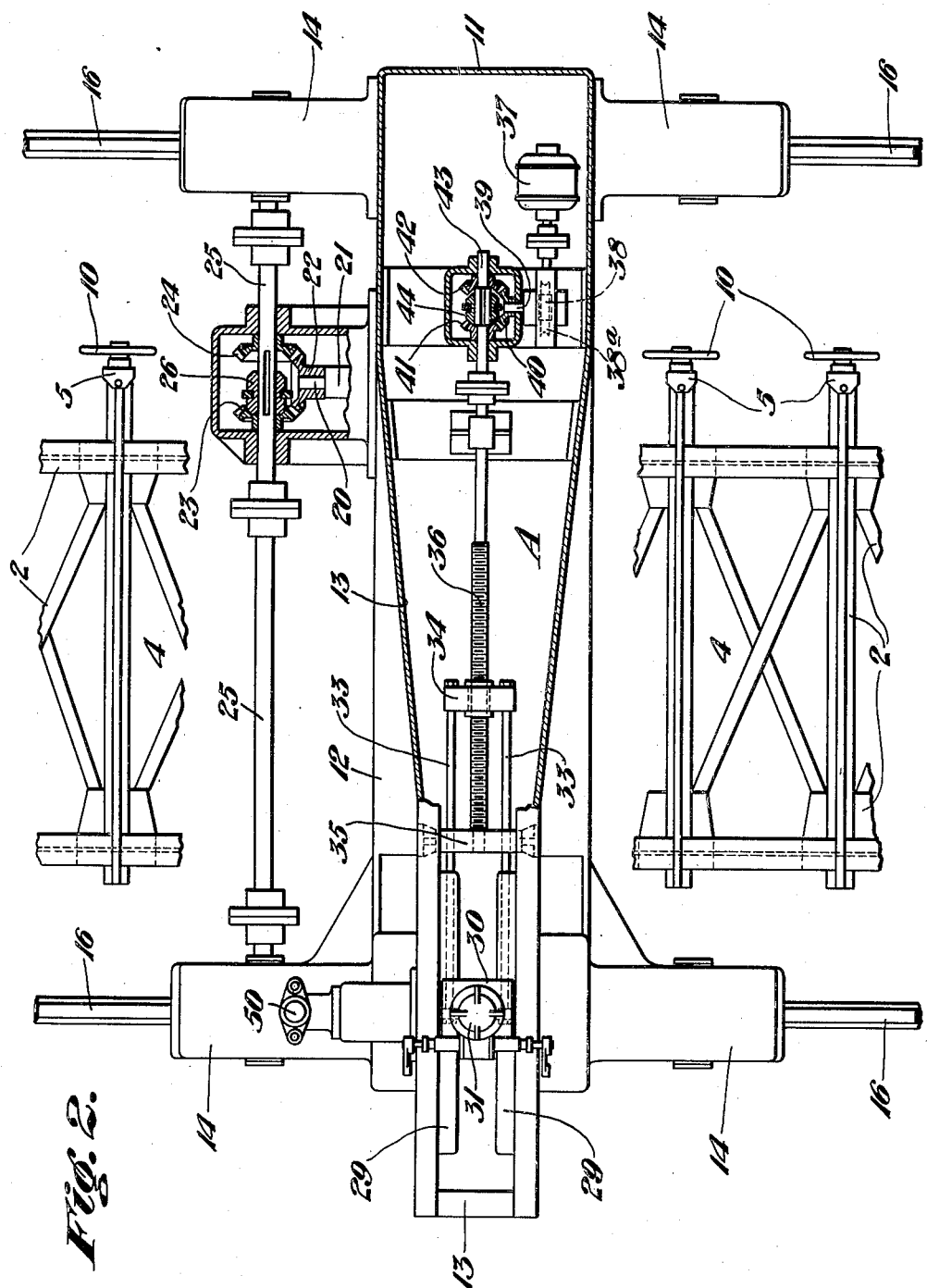
Figure 2 is a top plan view of the apparatus.
Figure 3:
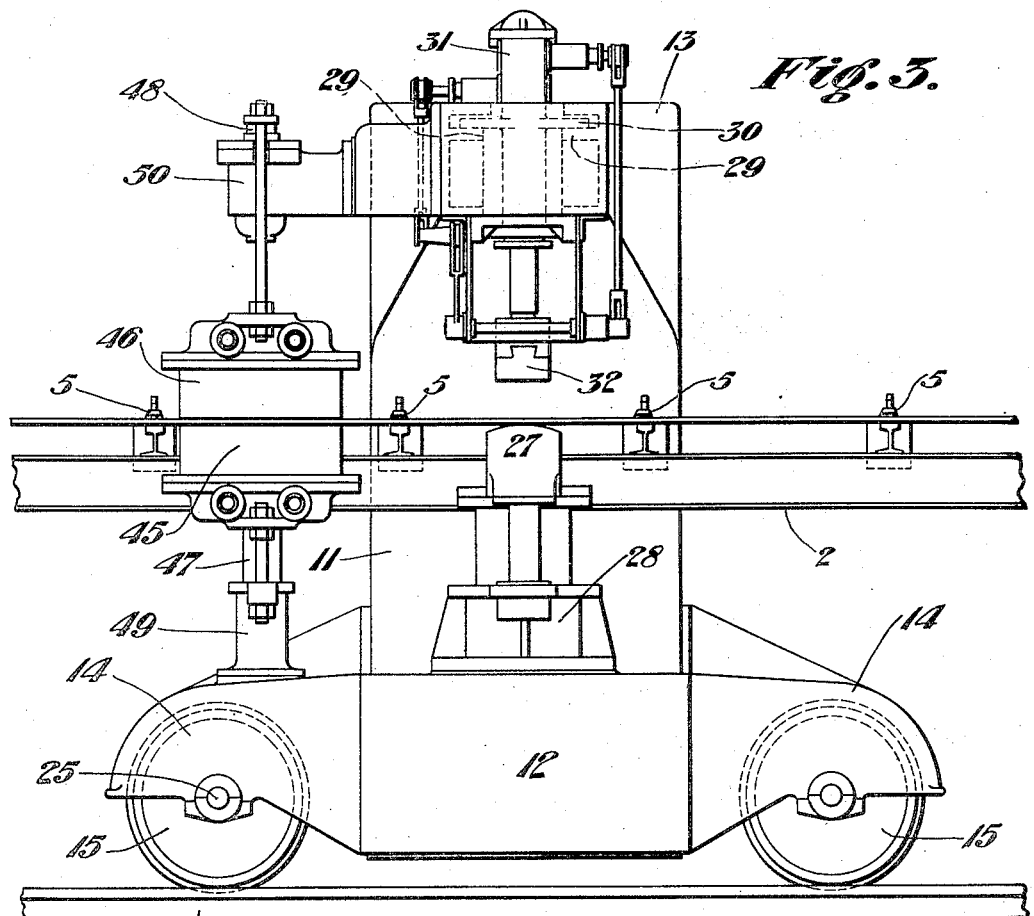
Figure 3 is an end elevation of the welding machine taken at the open or front end.
Figure 4:
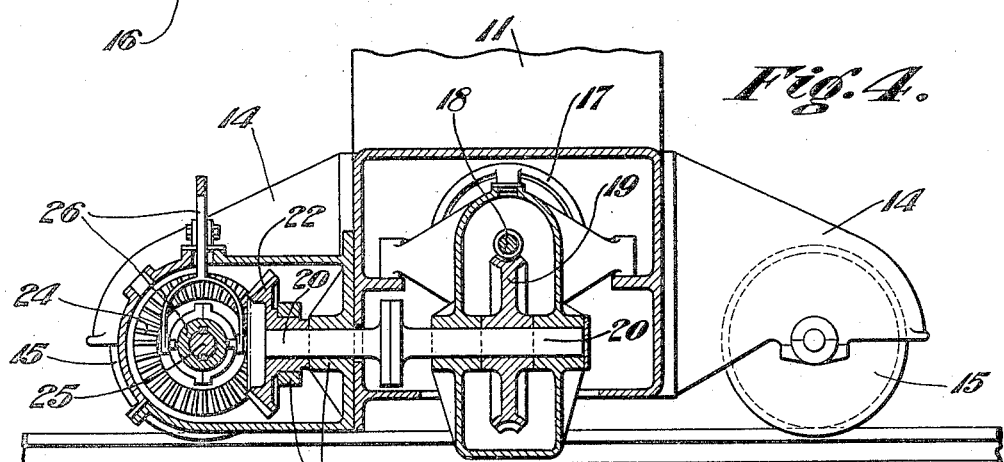
Figure 4 is a section taken on the line IV—IV of Figure 1.

In the diagrammatic view of Figure 5 two welding machines A are shown as operating simultaneously on the same plates. It will be understood that this is the preferred combination of apparatus used in welding plates and that only the one machine is shown in Figures 1 and 2 for purposes of clearness, although one machine only may be used in the combination if desired, and without departing from the scope of this invention.

It will also be understood that various modifications may be made in the design and construction of my novel plate welding apparatus without departing from the scope of my invention as defined in the appended claims.

In operation the plates are secured on the respective top sections of the table, and the clamps are adjusted toward each other until the edges of the plates overlap sufficiently to form a good weld. The burners are then moved downwardly into engagement or close proximity with the overlapped edges of the plates, and the edges are heated to a welding temperature for a short distance of their length. The burners are then raised and the welding machine moved into position so that the die underlies and the hammer overlies the heated portion of the plates. The die is then moved upwardly until it engages the under side of the plates and the hammer is reciprocated to form the weld. During the reciprocation of the hammer it is moved across or transversely of the weld by the operation of the shaft 36. Also during the reciprocation of the hammer the machine is moved bodily in a direction parallel with the weld, so as to cause the hammer to travel longitudinally of the weld, by means of the motor 17, which is geared to drive the machine on the tracks 16. When the heated portion of the plates has thus been welded the machine is repositioned and the burners are again lowered until they come into engagement with the overlapped portion of the plates immediately in advance of the welded portion, and the above cycle of operations is repeated again and again until a continuous weld is formed.

I claim—

1. A plate welding apparatus comprising in combination, a plate supporting table, a welding machine comprising a frame having one leg extending under said table and another leg extending over said table with an open throat between said legs, means for heating the plates, a die mounted on one leg of said machine, a hammer mounted on the other leg of said machine, means for operating said hammer to weld the plates, and means for causing a relative movement between said table and said welding machine in a direction parallel with the weld.

2. A plate welding apparatus comprising in combination, a plate supporting table, a welding machine comprising a U-shaped frame having one leg extending under said table, another leg extending over said table, and an open throat between said legs, means for heating the portion of the plates to be welded, a die mounted on one leg of said machine, a hammer mounted on the other leg of said machine, means for operating said hammer to weld the plates, means for moving the hammer transversely of the weld, and means for causing a relative movement between said table and said welding machine in a direction parallel with the weld.

3. A plate welding apparatus comprising in combination, a plate supporting table, a welding machine comprising a frame having one leg extending under said table, another leg extending over said table, and an open throat between said legs, means for heating the portion of the plates to be welded, a die mounted on one leg of said machine, a hammer mounted on the other leg of said machine, means for moving said die vertically relative to said welding machine and said table, means for operating said hammer to weld the plates, means for moving said hammer transversely of the weld, and means for causing a relative movement between said table and said welding machine in a direction parallel with the weld.

4. A plate welding apparatus comprising in combination, a plate supporting table, means for securing plates on said table, at least one welding machine comprising a frame having one leg extending under said table, another leg extending over said table, and an open throat between said legs, means for heating the portion of the plates to be welded, a die mounted on one leg of said machine, a hammer mounted on the other leg of said machine, means for operating said hammer to weld the plate, means for moving the hammer transversely of the weld, and means for causing a relative movement between said table and said welding machine in a direction parallel with the weld.

5. A plate welding apparatus comprising in combination, a plate supporting table, means for securing plates on said table, a pair of welding machines adapted to weld the plates supported on said table, each of said machines comprising a wheeled frame mounted on a track and having one leg extending under said table, the other leg extending over said table, and an open throat between said legs, means for heating the portions of the plates to be welded, a die mounted on the lower legs of said machines, a hammer mounted on the upper legs of said machines, means for operating said hammers to weld the plates, means for moving the hammers transversely of the weld, and means for moving said machines relative to said table in a direction parallel with the weld.

6. A plate welding apparatus comprising in combination a plate supporting table, means for securing plates on said table, a pair of welding machines adapted to weld the plates supported on said table, each of said machines comprising a wheeled U-shaped frame mounted on a track, said machines extending inwardly transversely of said table from the opposite sides thereof, one leg of each of said machines extending under said table, the other leg extending over said table, and an open throat between said legs, means carried by each of said machines for heating the portions of plates to be welded, dies mounted on the lower legs of said machines, hammers mounted on the upper legs of said machines, means for operating said hammers to weld the plates, means for moving the hammers transversely of the weld, and means for moving the machines in opposite directions longitudinally of the weld and relative to the table.

7. A plate welding apparatus comprising in combination, a plate supporting table, means for securing plates on said table, a pair of welding machines adapted to weld the plates supported on said table, each of said machines comprising a wheeled frame mounted on a track, said machines extending inwardly transversely of said table from the opposite sides thereof, one leg of each of said machines extending under said table, the other leg extending over said table, and an open throat between said legs, means for heating the portions of plates to be welded, dies mounted on the lower legs of said machines, hammers mounted on the upper legs of said machines, fluid operated means for operating said hammers to weld the plates, motor operated means for moving said hammers transversely of the weld, fluid operated means for moving said dies vertically relative to said welding machines and said table, and motors suitably geared to the wheels of said machines and adapted to drive said wheels so as to cause said machines to travel in opposite directions longitudinally of the weld and relative to the table.

8. In a plate welding apparatus, the combination with means for supporting the plates to be welded, of a welding machine comprising a frame having one leg extending under the plates and its other leg extending over the plates, vertically movable burners mounted on said machine for heating the portions of the plates to be welded, means for moving said burners vertically, a die mounted on the lower leg of said machine, a hammer mounted on the upper leg of said machine, means for operating said hammer to weld the plates, and means for moving said machine relative to said table in a direction parallel with the weld.

9. In a plate welding apparatus, the combination with a welding machine for welding the plates, of a table for supporting the plates during the welding operation, said table comprising a fixed supporting structure, a top portion, adjustable clamps for securing the plates to said table, and means for moving said clamps.

10. In a plate welding apparatus, the combination with a welding machine for welding the plates, of a table for supporting the plates during the welding operation, said table comprising a fixed supporting structure, a top portion comprising two sections spaced apart to permit the operation of said welding machine, transversely movable clamps mounted on said top sections for securing the plates to be welded, and means for moving said clamps independent of each other.

In testimony whereof, I have hereunto signed my name.

BORIS S. ROBINOFF.